PLASTIC ARTICLES AND PROCESS FOR THEIR MANUFACTURE

Original Filed June 20, 1960 3 Sheets-Sheet 1

INVENTOR.
CHARLES L. LIGHTFOOT
BY Peter H. Smolka
ATTORNEY

PLASTIC ARTICLES AND PROCESS FOR THEIR MANUFACTURE

Original Filed June 20, 1960 3 Sheets-Sheet 2

United States Patent Office

Re. 26,234
Reissued July 18, 1967

26,234
PLASTIC ARTICLES AND PROCESS FOR THEIR MANUFACTURE

Charles Leandro Lightfoot, Conshohocken, Pa., assignor, by direct and mesne assignments, to National Home Products, Inc., Bridgeport, Conn., a corporation of Delaware Original No. 3,128,262, dated Apr. 7, 1964, Ser. No. 37,502, June 20, 1960. Application for reissue Mar. 29, 1966, Ser. No. 540,793
13 Claims. (Cl. 264—41)

Matter enclosed in heavy brackets [ ] appears in the original patent but forms no part of this reissue specification; matter printed in italics indicates the additions made by reissue.

My invention relates to plastic articles containing a gas phase hermetically sealed therein, and to a new process for making such articles. More particularly it relates to the manufacture of shaped, hollow, hermetically sealed plastic bodies or plastic foams the cavities or vacuoles of which are inflated with gas at a pressure equal to or greater than one atmosphere. Still more particularly this invention relates to the manufacture of such gas inflated articles and foams from plastics which are high melting and otherwise difficult to process, such as polytetrafluoroethylene.

Gas filled articles of tough, high-melting, chemically resistant plastics such as polytetrafluoroethylene ("Teflon," hereinafter referred to as "PTFE") have many potential uses as static and dynamic seals or gaskets, resilient closures, shock absorbing or buffering media and so on. The gas filling of these articles imparts to them a degree of resiliency not possessed by the plastic itself, and which is presently attained by sandwiching resilient inserts of natural or synthetic rubber or the like into envelopes, sheaths or enclosures which are fabricated from PTFE or other appropriate plastic. These rubber-filled articles suffer the disadvantages of being costly to produce, of being subject to the temperature limitations of the rubber filling and of gradually losing resiliency during prolonged exposure to temperatures approaching the service temperature limit of the rubber. Under the latter conditions rubber suffers compression set and, in time, ceases completely to serve its function.

A filling of a stable gas suffers none of these disadvantages; its resiliency and elasticity are permanent properties. In addition to this, expansion of the gas filling at elevated temperature tends desirably to increase sealing pressure. However, heretofore there have been no practical methods for producing hermetically sealed, gas-filled articles from plastics such as PTFE. Methods requiring heat-sealing or cementing of sintered PTFE surfaces are generally laborious. Methods causing evolution of gas inside the molded article during the sintering cycle have proved unsatisfactory as a result of the extremely low yield strength of plastics such as PTFE in the gel state: Substantial gas evolution tends to rupture the piece. Furthermore, cooling the article from the sintering temperature (e.g. 680–740 F. in the case of PTFE) to ambient temperature produces such a contraction in gas volume that it is virtually impossible to produce an article with a substantial gas filling, not to mention a superatmospheric gas filling. Such might be accomplished by sintering the pieces while confined in molds; but this is cumbersome and involves great investment in molds which are tied up throughout the sintering cycle.

It is an object of this invention to make gas-filled articles and foams of PTFE or other plastics. Another object is to provide a method whereby the gas filling could be introduced into the plastic article after it had been sintered and cooled below the transition temperature of a plastic such as PTFE and which would not depend upon any sealing operation of any kind. These and other objects, and ways of achieving them, will become more fully apparent from the subsequent description and the attached drawing.

In the drawing:

FIG. 1 is a flow sheet showing the principal steps of the process of the present invention.

FIG. 1*a* is a planar view of a wafer containing a gas-generating solid encapsulated therein;

FIG. 1*b* is a cross-sectional elevation of the wafer taken along line IB of FIG. 1*a*;

Figure 1:
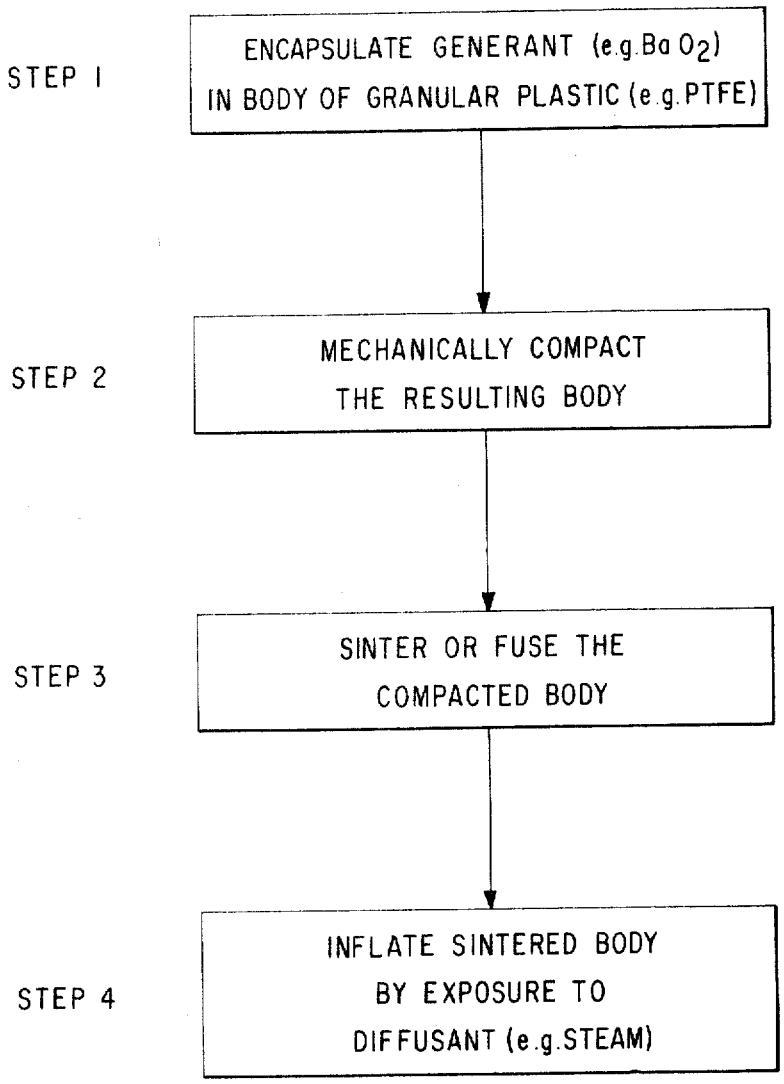

It has now been discovered that new and improved gas-filled plastic articles can be made by a new process based upon the permeability of the plastic being treated. For instance, it is known that PFTE has a relatively high permeability to certain gases, vapors and liquids while having a very low permeability to others. Thus PTFE has relatively high permeability to steam, carbon dioxide gas and liquid concentrated hydrochloric acid, but relatively low permeability to air, nitrogen, oxygen, benzene and other hydrocarbons, anhydrous hydrogen chloride gas and hydrogen. Specifically, for instance, the permeability of PTFE to steam at 334° F. is about 100 times greater than its permeability to air at room temperature. Similarly, plastic polyvinyl alcohol is quite permeable to water vapor but exhibits low permeability to hydrocarbons and most other non-polar gases and vapors. All hydrocarbon plastics such as polyethylene are highly permeable to hydrocarbons, but exhibit low permeability to water vapor and oxygen. Moreover, in the case of the particularly difficult plastics such as PTFE the present invention makes important use of the great decrease in permeability with increasing crystallinity of the plastic, that is the hereafter described diffusion-inflation step characteristic of the present invention is preferably carried out while the plastic is in a state of relatively low crystallinity and high permeability and may thereafter be treated to increase its crystallinity and to decrease its permeability.

Throughout the subsequent description frequent reference will be made to the reactants which give rise to the gas filling within the solid plastic body or envelope. For the sake of simplicity these reactants will be defined as follows:

"Generant."—The solid reaction which is embedded, encapsulated or dispersed in the article molded from the plastic and which is reacted upon by the diffusing gas, vapor or liquid to cause evolution of gas. The primary requirement for the generant, aside from its reactivity toward the diffusing fluid, is its ability to withstand the normal processing temperatures which the article must undergo during subsequent manufacturing steps, without the generant decomposing, vaporizing or evolving gas or vapors. For instance, when articles are fabricated from PTFE, the generant should withstand the sintering temperature of PTFE (about 680–740° F.) without decomposing or generating gas.

"Diffusant."—The gas, vapor or liquid which diffuses through the plastic to act upon the embedded generant, releasing gas.

"Gas Fill."—The gas released by the reaction of the generant with the diffusant. The term "gas fill" will include any chemical entity which will be in the gaseous state in the anticipated operating temperature range of the fabricated article, or within any predetermined portion of that range, regardless of the physical state of the evolved chemical entity at any lower temperature. Thus, for instance, by using a gas fill which changes from a liquid to a gas at a certain temperature within the anticipated operating range, a gas-filled envelope or bellows made according to this invention can be used as the actuating element of a temperature responsive valve or the like. Of course, where gas inflation is needed only above a certain relatively high temperature, the generant may simply consist of a solid or liquid substance which will evolve gas by evaporation at the desired temperature, e.g., mercury, biphenyl, binaphthyl, etc. The gas fill is preferably a substance to which the plastic envelope is relatively impermeable. However, where the formation of a void, rather than permanent positive inflation is desired, the gas fill may consist of a substance which gradually diffuses out, e.g. $CO_2$ in the case of PTFE articles. By definition, the term "reaction" as used above will include the displacement by the diffusant of an adsorbed chemical entity or mixture from a solid adsorbent, which entity or mixture will be gaseous at the operating temperature, where the diffusant is more strongly adsorbed on the encapsulated solid adsobent-generant. In such a case the generant is an essentially inert adsorbent such as silica gel, activated alumina, molecular sieves, adsorbent char, etc.

Examples of reactants and the evolved gas fills are given in the table below. It will be understood, of course, that these examples are being given for purposes of illustration only and are not intended to limit the scope of the invention.

TABLE I

Gas Generating Reactions

| Ex. | Generant | Diffusant | Gas Fill |
|---|---|---|---|
| 1 | Aluminum Foil or Powder. | Conc. Aqueous HCl | Hydrogen. |
| 2 | Barium Peroxide | Steam or $CO_2$ | Oxygen. |
| 3 | Aluminum Carbide | Steam | Methane. |
| 4 | Calcium Carbide | do | Acetylene. |
| 5 | Magnesium Nitride | do | Ammonia. |
| 6 | Calcium Cyanamide. | do | Do. |
| 7 | Magnesium Silicide | do | Hydrogen Silicide. |
| 8 | Calcium Sulfide | $CO_2$ or conc. HCl aq | $H_2S$. |
| 9 | Calcium Phosphide | Steam | Phosphine. |
| 10 | Lithium Hydride | do | Hydrogen. |
| 11 | $P_2O_5$[a]+NaCl | do | HCl. |
| 12 | $Na_2CO_3$ | Aq. HCl | $CO_2$. |

[a] Metastable or stable orthorhombic form is preferred so as to have lowest vapor pressure at fabrication temperature.

It should be noted that using aluminum, it was found that a preliminary exposure of the plastic article containing the embedded aluminum to liquid hydrochloric acid preferably at somewhat elevated temperature, e.g. at 150–250° F. in an autoclave for ½ to 2 or more hours, followed by exposure to steam, is a particularly effective way of producing a hydrogen filling.

The gas evolving step can often be performed at atmospheric pressure. In the case of PTFE this is particularly true when steam or aqueous hydrochloric acid are used as the diffusant. However, in order to accelerate the reaction, and to promote crystallization of the plastic if desired, it is preferred to conduct the gas evolving step at elevated temperature and pressure, e.g. in an autoclave at a temperature between about 300 and about 600° F. Steam is usually the most practical diffusant since it is readily generated at or near its point of use, is noncorrosive and is relatively non-hazardous. Furthermore, in the case of PTFE it diffuses through the plastic at an exceptionally high rate. For instance, sufficient water vapor can permeate 1 sq. in. of a 1-mil thick layer of PTFE of low density (low crystallinity) at 334° F. in one hour to release the following amounts of gas: 37 ml. $O_2$ from $BaO_2$; 37 ml. $H_2$ from Al, Zn or other acid pretreated metal; 24 ml. $NH_3$ from $Mg_3N_2$; 18 ml. $CH_4$ from $Al_4C_3$; 73 ml. $H_2$ from LiH, NaH, etc. In addition, steam can furnish heat and pressure in this process as well as serving as diffusant. In some cases, however, the choice of another diffusant such as carbon dioxide or aqueous hydrochloric acid may be expedient.

The amount of generant used is not particularly important since as long as more than enough generant is present to produce the desired amount of gas, the proper degree of inflation can be obtained by interrupting the supply of diffusant at the appropriate time; the unreacted excess of generant then remains inert in the finished article or in some cases may slowly liberate additional gas to compensate for any gas fill that diffuses out during the life of the article. Of course, alternatively the exact amount of generant required to produce any desired amount of gas fill can be calculated and charged accordingly.

Several methods are available for encapsulating the generant in the fabricated plastic piece. The simplest is the following. The generant is deposited as a powder, granulation or a pressed compact onto a charge of the plastic molding powder in a mold, covering this with a second charge of the plastic and pressing. While this is feasible, it is not a convenient procedure. Powders and granulations are difficult to charge and position accurately and compressed compacts made from them are usually friable, requiring extreme care in handling. Furthermore, it may be undesirable to have the powdered materials exposed to the atmosphere or contact with personnel at the performing site. For these reasons, other methods described below are preferred.

Method A.—Deposit the generant between layers of a porous, inorganic material, e.g. asbestos paper, glass-fiber felt, pressed fine steel wool, copper wool or other metal wool whose structure is dense enough to retain the powdered or granulated generant. The porous material must be sufficiently stable to withstand the later sintering or other processing temperatures without melting or evolving gas. As used, the material should be completely dry and should not be very hygroscopic. After making the "sandwich" containing the generant, the whole is pressed or calendered. Compacts of the desired shape and size are die-cut from the whole sheet, yielding wafers which retain the generant and which are easily handled. These wafers can be made well is advance and can be stored out of contact with the atmosphere or personnel until they are needed, i.e. until they are positioned on a charge of plastic in the forming mold, covered with a second charge of plastic and the entire charge is pressed, yielding the required "preform" of the desired article.

Method B.—Deposit the generant in powder form onto a thin sheet or foil of a thermally stable material which is unaffected by the generant; e.g., copper, aluminum or lead foil or a thin sheet or tape of plastic, preferably of the same material as the plastic from which the main article is to be fabricated. It is preferable that shallow pockets to receive the generant be formed in the receiving sheet or foil to facilitate and regulate the charge. Such pockets can be conveniently formed by several means, including vacuum forming, embossing, rubber-pad forming, etc. A second sheet or foil is superimposed on the charged sheet and the pocketed charge sealed off by crimp-pressing or the like. Finally wafers are cut as in Method A. If thin plastic film is used; e.g. PTFE film in an article made from PTFE, perforation is not necessary. Otherwise, immediately before use the metal foil cover is perforated to impart permeability to the reactant capsule. Such perforation can be quickly and efficiently done by pressing the wafer between suitably shaped platens which have been faced with a medium-grit sandpaper or emery cloth. This produces a high degree of permeability without destroying the wafer's ability to contain the powdered generant. The wafers are then used in the same way as those prepared by Method A.

Method C.—PTFE or other appropriate plastic in powder form is blended with the generant, e.g. 0.005 to 0.100 gram of generant per gram of plastic, and from this blend a thin sheet is pressed. For the purposes of this method it is preferable not to press this sheet to maximum density, since it is often advantageous for the wafer or compact to possess some "give" during formation of the article. For instance, the application of a pressure of about 100 to 500 lbs. sq. in. at room temperature is satisfactory. Wafers are cut from this sheet and are used exactly as the wafers from the previous two methods This approach avoids the introduction of any foreign material, other than the generant, into the molded product. Moreover, if the ratio of plastic to generant is sufficiently high in the wafer, e.g. 10/1 to 200/1, the wafer will eventually produce a gas filling in the form of an inflated plastic foam. Indeed, this method can be used to make a new type of gas-loaded plastic foam by taking such blends, e.g. PTFE with barium peroxide, molding them to the desired shape, sintering, if desired subjecting to other manipulations or fabricating steps, e.g. installing in a mechanical assembly, and finally exposing the sintered article to action of the proper diffusant such as steam. In this manner foamed molded parts, foamed sheet or tapes, etc., can be economically fabricated, permitting, if desired to carry out the final foaming step after the article has been installed in place of its end use.

Next typical fabrications of gas-filled PTFE articles will be described.

EXAMPLE 1

The intended article is a gas-filled circular gasket having an outside diameter of 4" and an inside diameter of 2". The gas filled area concentric with the inside and outside peripheries of the gasket will have the dimension of 3¾" OD and 2¼" ID and the maximum inflated thickness will be about ¼". The thickness at the edges will be approximately 1/32".

Figure 1A:
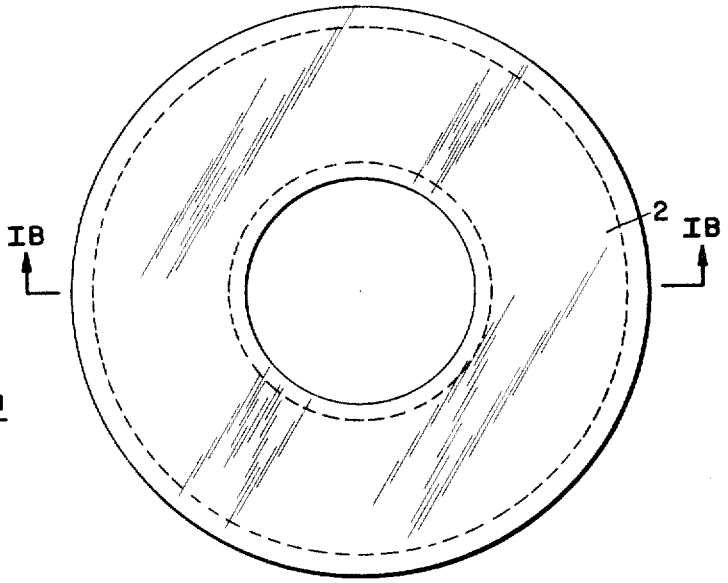
Figure 1B:
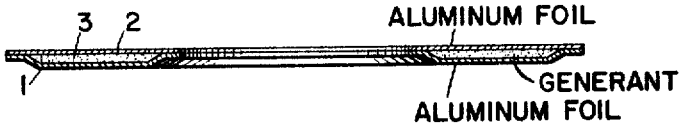

A wafer containing a powdered generant barium peroxide, and consisting of two layers of 1 mil aluminum foil 1 and 2 enclosing the generant 3 is illustrated in FIGS. 1*a* and 1*b*; FIG. 1*a* is a planar view of the wafer while FIG. 1*b* is a cross-sectional elevation. The wafer is prepared as follows: A sheet of aluminum foil 1 is embossed to form a shallow annular depression about 5 mils deep and 2¾" ID x 3½" OD. About 0.25 gram of powdered barium peroxide 3 is deposited evenly within the depression or pocket. A second sheet of foil 2 is placed over the first sheet containing the generant and the whole is transferred to a hydraulic or mechanical press. The foil should rest on perfectly flat and smooth platens or on a smooth and somewhat resilient surface such as a thin reinforced phenolic sheet. A die having concentric smooth annular faces of 3¾" OD x 3½" ID and 2¾" x 2½" ID is placed on the foil "sandwich" concentrically with the embossed depression. Pressure is applied to a loading of 10–20 k.p.s.i. (1 k.p.s.i.=1,000 p.s.i.) over the areas covered by the die faces. This seals in the generant charge. After release of the pressure, the "sandwich" is removed and trimmed to yield the wafer of required dimension; i.e. 3¾" OD x 2½" ID. This can be done by a variety of methods including die-cutting with steel-rule dies.

Figure 2:
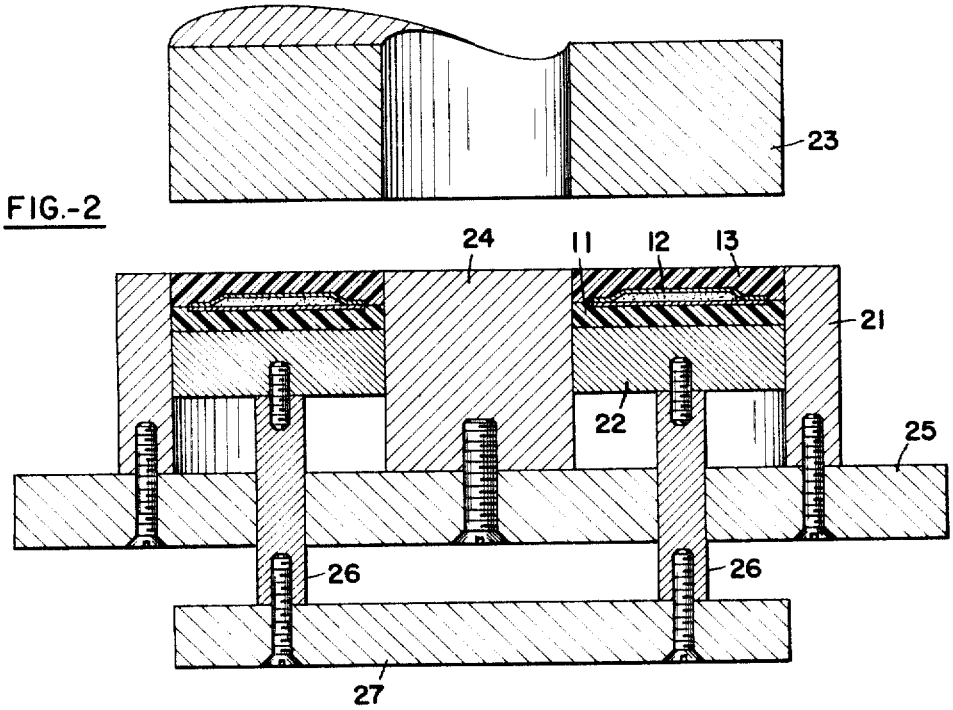
FIG. 2 is a cross-sectional elevation of a mold used for making inflatable plastic "preforms" according to this invention.

Immediately prior to use, the wafer, designated by the numeral 12 in FIG. 2, is finely perforated by pressing between platens which are faced with emery cloth to provide access of diffusant to the generant during the gas filling operation.

The gasket is now molded as follows, using a mold similar to that illustrated in FIG. 2. The mold consists of a cylinder 21 having an inside diameter of 4" and mounted on the mold base 25; core 24 mounted concentrically with 21 on the base; a lower plunger 22 which fits closely and slidably within the cavity formed by 21 and 24 and which is provided with connection to a source of linear motion such as a pneumatic or hydraulic cylinder through tie-rods 26 connected by a yoke 27. The tie rods pass through holes in the base 25, these holes having a large clearance allowance for the rods to prevent friction or binding. A force member 23 is mounted on the hydraulic ram of the press, the force member fitting the cavity closely in the same manner as plunger 22. Usual tool and die-making practices are observed for fits and tolerances for the construction of the mold, which can be used in standard molding presses employed in the molding of materials such as PTFE.

Referring again to FIG. 2 a charge 11 of fine "Teflon" powder (mol. wt. about 10,000,000; particle size average about 35 microns) is charged and levelled in the cavity. The charge shall be about 5.5 grams. The wafer 12, prepared as described above, is placed on the charge 11 concentrically with cylinder 21 and core 24, and a second charge 13 of about 5.5 grams of PTFE is added. The charges of PTFE may be weighed or may be made volumetrically when the bulk density of the powder has been determined. Volumetric charging is easily accomplished in the type of mold illustrated by adjusting the depth of cavity by positioning the plunger 22 so that an excess of powder is added and the charge levelled with the upper surface of the mold with a thin straightedge, two separate positions of 22 being used for the two charges 11 and 13 in the present example. Careful loading is important in order to assure a preform of the requisite uniform density. The force member 23 is now lowered to compact the charge, final pressure being brought to 2–4 k.p.s.i. on the charge, or 19,000–38,000 pounds ram force. As a result the charge is compacted to yield a preform having a height equal to about ¼ to ⅛ of the original charge height depending on the grade of PTFE used. The ram 23 is now retracted and the plunger 22 is advanced to eject the preform.

The preform is transferred to an oven maintained at about 680 to 740° F., e.g. at about 700° F. for sintering to a dense, integral structure. The compacted preform is coherent but consists of individual polymer particles which must be fused together to form a continuum by being subjected for a period of time at a temperature higher than the transition temperature of the polymer (ca. 620° F. in the case of PTFE). The time required depends upon the preforming pressure and upon the thickness of the preform, but in the present case it will be about 30 minutes. In the particular piece under consideration, the two layers of plastic will be completely fused together in the form of peripheral flanges but separated in the area covered by the wafer containing the generant. Where desired the cohered flange portion may be made large enough to permit cutting to a shape different from the forming mold or to allow drilling or other operations that may be desired.

The piece is removed from the oven at the end of the sintering cycle and is rapidly quenched, e.g. by immersion in cold water, in order to retain a predominately amorphous structure.

An amorphous structure is desirable since it favors rapid diffusion of steam or other diffusant in the final gas evolving operation.

Quenching may be accomplished by any means that quickly cools the sintered part below about 575° F.; e.g. "coining" the part in a cooled die, immersion in cold water, cooling in moving air, etc. Since rate of cooling is dependent on the thickness of the piece, the quenching method will be determined to a large degree by dimensions of the part. For relatively heavy sections it may be desirable to quench in ice water. Very heavy moldings such as billets used for the manufacture of tape cannot be successfully quenched, and in such instances the tape or other thinner articles made from such moldings may be brought to the gel condition by heating and then quenched to reduce crystallinity.

The quenched sintered piece is now exposed to an appropriate diffusant under conditions of temperature and pressure which are found to yield optimal results for the specific reactants used and for the specific size and shape of the finished piece. For instance, in the case of the particular piece under consideration, exposure to steam at a temperature of 300° F. and a pressure of 82 p.s.i.g. in an autoclave for about 3 hours is satisfactory. In nearly all cases a broad range of temperature and pressure will effect the reactions leading to the evolution of the gas fill, but changes in these conditions can be used to modify the rate at which the diffusion processes occur. Furthermore, by carrying out this step at a temperature favorable for a high crystallization rate of the plastic (e.g., above 575° F. in the case of PTFE) but below its "melting point" (PTFE undergoes transition to its gel state at about 620° F.) permits the gas release step to be carried out simultaneously with the crystallization of the plastic which tends to seal in the evolved gas more permanently. Alternatively, the diffusion process can be carried to completion (or to any desired degree) at a temperature between about 212 and 575° F. in the case of steam, or even at room temperature using a diffusant such as aqueous hydrochloric acid, after which the temperature can be raised into the range between 575 and about 610° F. to effect crystallization of the PTFE envelope. The diffusion and crystallization steps are advantageously performed under a pressure consistent with the operating temperatures in order to minimize the danger of the evolved gas bursting the article. For example, for carrying out the crystallization at 600° F. of a piece wherein the generant has been completely reacted in the diffusion step, it will be desirable to operate at pressures between about 200 and 1500 p.s.i.g. This can be done by exposing the piece to steam in an autoclave. The autoclave and its contents are desirably cooled before the autoclave pressure is released, to permit contraction of the gas fill and to reduce the inflation pressure.

It will not be necessary or even desirable in all cases to develop maximum crystallinity of the plastic in articles manufactured by the disclosed process. In most applications where PTFE is used, the desired range of crystallinity will be between 50 and 75%. For instance, where maxium yield or compressive strength are desired, crystallinity values toward the lower end of this range are preferred. On the other hand, where retaining the gas filling under all service conditions and for long service life is important, maximum possible crystallinity will be sought. In all cases, the selected crystallinity level will be derived from the ultimate operating characteristics required by the specific application. For best processing conditions, however, it is advantageous to start with the plastic at a low level of crystallinity and to raise the crystallinity to its ultimate design value during or shortly after the gas evolving operation. This permits short time cycles in the diffusion step and develops the lowest permeability value with respect to the gas fill before the processing pressure is released. By proper choice of a combination of gas fill and chemical composition and degree of crystallinity of the enveloping plastic, the article can retain the gas fill practically indefinitely, even when the piece is exposed to atmospheric pressure. "Teflon 6," having a reported molecular weight of about 3,000,000, is particularly suitable for yielding highly crystalline products, 75% crystallinity being obtainable by annealing at 600° F. for about 20 hours.

EXAMPLE 2

The procedure for molding the gas-field gasket described in Example 1 is carried out with the substitution of a simple annular piece of 1 mil aluminum foil 3¾" OD x 2¼" ID for the "Sandwich" structure containing barium peroxide. The compressed and sintered gasket, obtained as in Example 1, is immersed in 37% aqueous hydrochloric acid for 72 hours at room temperature and is then transferred to an autoclave and is exposed to steam at approximately 40 p.s.i.g. (ca. 286° F.) for several hours after which the steam is shut off and the autoclave is permitted to cool to near room temperature. The autoclave is then opened and the hydrogen-filled closed cell gasket is removed.

EXAMPLE 3

A gasket of the same dimensions as in Example 1 is to be molded from a uniform blend of PTFE polymer and finely powdered aluminum carbide in the ratio of one part by weight of aluminum carbide per fifty parts of PTFE. Pressing is done exactly as in the first example, except that no inserted "wafer" is employed and the blended powder is loaded into the die in one charge. In this example a charge of 20 grams of powder blend shall be used to yield a gasket approximately 1/16" thick after sintering.

After the gasket has been sintered and quenched as in Example 1, it is exposed to steam at 300° F. in an autoclave at 82 p.s.i.g. for 10 hours after which the autoclave and its contents are allowed to cool and pressure is released and the foamed gasket is removed. Thickness should be about ⅛" after foaming.

EXAMPLE 4

Figure 3:
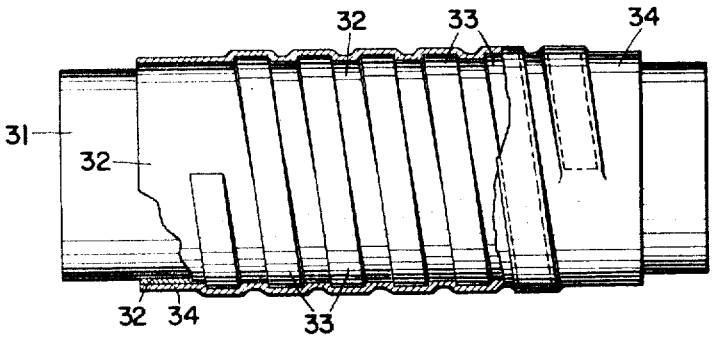
FIG. 3 shows a "preform" of a thin walled tubular plastic article capable of being made semi-rigid by inflation according to the present invention.
Figure 4:
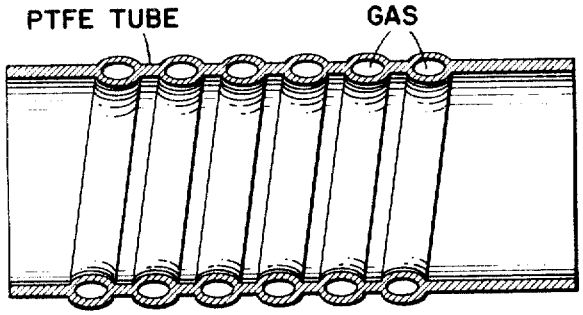
FIG. 4 shows a longitudinal cross-section of the same tubular article fully inflated.

The invention can be used to produce thin-walled tubular PTFE structures which are made semi-rigid by gas evolved and contained as a spiral pocket within the wall of the tubular structure as illustrated in FIGS. 3 and 4. To do this, a metal mandrel 31 whose diameter corresponds approximately with the desired inside diameter of the tubular structure desired and whose length is somewhat greater than that of the desired structure is wrapped with unsintered PTFE tape 32 of any desired thickness; e.g., 0.005". For example, the mandrel having a diameter of two inches is spirally wrapped along somewhat less than its entire length with 0.005" x ½" unsintered PTFE tape with 50% overlap of the tape to yield a tubular wrap having approximately 0.010" thickness. This operation is easily performed on a lathe operating at low speed. Next, a spiral wrap of 1 mil thick, 0.25 inch wide aluminum foil strip 33 is applied with a lead of 0.375" per turn over the PTFE layer on the mandrel. This foil wrapping shall begin and terminate at some distance from either end of the PTFE layer. The ends of the foil are effectively "tacked" down with a small strip of unsintered tape in order to hold the foil spiral in place for the next operation. Another spiral wrap of unsintered PTFE tape 34 is now applied exactly in the manner of the first layer, this last wrapping extending over the entire surface of the first PTFE layer. The mandrel is placed in an oven held at a temperature of about 700° F. and is left until the PTFE reaches the gel state as evidenced by its change from near opacity to translucency. The time required depends on the temperature of the oven and the mass of the mandrel. It is preferable that the mandrel is in the form of a thin-walled steel tube to reduce the time required to reach the sintering temperature. For optimum resistance to oxidation at a high temperature the mandrel should be chromium-plated.

The mandrel is now quickly removed from the oven and is cooled rapidly in cold water. It is then heated to about 200–220° F.; e.g., by immersion in boiling water, to expand the PTFE for easy removal. The PTFE tube, which is now a dense structure is removed and is immersed in concentrated (37%) aqueous hydrochloric acid at room temperature for 24–48 hours and is then exposed to steam at atmospheric pressure until the desired extent of gas evolution has occurred. The resulting article, by virtue of the gas filling, is considerably more rigid than a tube of equal dimensions and weight without enclosed gas. It is to be noted that somewhat greater rigidity is obtained if the exposure to steam is performed at greater than atmospheric pressure in an autoclave, followed by free cooling without venting the steam pressure of the autoclave; i.e. by permitting the pressure of the vessel to fall as a consequence of cooling.

For PTFE structure destined for exposure to low ambient pressure, e.g., in space vehicles, only a preliminary exposure to hydrochloric acid followed by thorough washing with water may be applied in order to provide sufficient gas (hydrogen) to expand the structure as it enters the rarefied atmosphere.

While the foregoing description has been directed primarily at the manufacture of plastic articles containing a single gas-filled cavity, it will be understood that the invention can be modified to make plastic envelopes containing a plurality of separate or communicating cavities. This can be accomplished by using a plurality of small gas evolving wafers properly spaced from each other so as to allow the enveloping plastic to form a solidly fused seam or bond between the several wafers. Alternatively, similarly as illustrated in Example 3, formable plastics can be made according to the present invention by molding large billets or cylinders from blends of polymer and the gas evolving agent. Such blends may be prepared either by mixing the ingredients in powder form or, where the thermoplastic nature of the resin allows, by blending the generant into the resin on a heated roll mill or in a Banbury mixer or by other well known techniques as applied to special plastics. In either case, the molded billet or cylinder is subjected to the necessary heat cycling to yield a dense, integral molding which can then be converted by machining to useful articles before undergoing the gas evolving process. For example, the solid billets can be converted to tape or other articles by skiving or machining, which articles can be subjected to further fabrication steps, including heat sealing, hot forming, etc., before undergoing the gas evolving step and without danger of affecting the foam structure. A "formable" tape can be provided, such tape being subjected to any desired fabricating operation in the dense state and, finally, converted to a foamed article by the methods described herein.

Similarly an insulating gasket can be fabricated and installed in difficultly accessible locations of an assembly and inflated or foamed in situ.

In addition to the embodiments described above, others will undoubtedly occur to those skilled in the art without departing from the spirit of this invention. For instance, extruded, unsintered PTFE tapes containing the gas evolving agent as dispersed phase can be used for methods of fabrication for which unsintered PTFE tapes are suited, e.g. wire insulation.

The foregoing description has been devoted mainly to the treatment of PTFE, for which it is particularly valuable because of the unusual difficulties encountered when attempting to handle it by more conventional methods. However, the invention is similarly applicable to other polyhalogenated plastics such as polymerized trifluorochloroethylene ("KEL-F"), as well as to relatively easy to handle plastic materials such as polyethylene, polystyrene, polyvinyl alcohol, polyvinyl chloride, and even the various elastomeric polymers such as ethylene polysulfide rubber (Thiokol) as well as the diolefin polymers such as natural rubber, synthetic rubber of the SBR type, nitrile type rubber, butyl rubber, polychloroprene, etc. In the case of the diolefinic polymers the present invention offers the advantage that it permits curing the rubber in the dense state according to usual vulcanization recipes and "foaming" the article after it has been conventionally cured. In this manner, the cured article can be shipped in the dense state and foamed only at its destination. In every case, of course, it is essential to choose a proper combination of generant and diffusant and a proper geometric configuration such that the diffusant can readily permeate through the plastic or rubber and react with the encapsulated generant to release within the plastic a gas which cannot readily permeate out.

The scope of the invention is particularly pointed out in the appended claims.

What I claim as my invention is:

1. An article of manufacture comprising a solid body of polytetrafluoroethylene containing uniformly dispersed therein a finely divided thermally stable solid selected from the group consisting of barium peroxide, aluminum carbide, calcium carbide, magnesium nitride, calcium cyanamide, magnesium silicide, calcium phosphide, lithium hydride, and a mixture of phosphorus pentoxide with sodium chloride.

2. An article of manufacture comprising a dense body of polytetrafluoroethylene containing aluminum carbide powder uniformly dispersed therethrough.

3. An article of manufacture comprising a fused mass of polytetrafluoroethylene containing particles of barium peroxide dispersed therein.

[4. A process for making plastic articles containing at least one gas-filled closed cell therein which comprises encapsulating a thermally stable solid generant within a continuous phase of plastic and exposing said plastic and generant encapsulated, therein to a fluid diffusant capable of diffusing through said plastic itself and of undergoing reaction with said encapsulated generant to release a gas within said plastic, said exposure being effected under exposure conditions adapted to maintain said gas releasing reaction, said plastic being relatively impermeable to said released gas.]

[5. A process according to claim 4 wherein said plastic is polytetrafluoroethylene, said solid generant is aluminum, and said diffusant is concentrated aqueous hydrochloric acid.]

6. A process for making gas-filled articles from polytetrafluoroethylene plastic which comprises forming a first layer of said plastic, placing on said layer a thermally stable solid capable of evolving gas by reaction with a fluid, said solid being placed on said layer in a manner such that a continuous peripheral portion of said plastic layer remains substantially free from said gas-evolving solid, covering said gas evolving solid and said peripheral portion of said first layer of plastic with a second layer of said plastic, compacting said layers by applying pressure thereto, sintering the resulting compact by heating to an elevated temperature, and exposing said compact to a fluid capable of diffusing into the plastic and releasing a gas therein by reaction with said gas-evolving solid so as to form a gas pocket within a plastic envelope.

7. A process according to claim 6 wherein the compact is sintered at a temperature above its transition temperature and wherein the sintered compact is heated to a temperature conducive to a high crystallization rate for the plastic during the step of contacting it with said fluid.

8. A process according to claim 6 wherein said gas-evolving solid consists at least in part of a metal capable of reacting with hydrochloric acid and wherein said fluid comprises concentrated aqueous hydrochloric acid.

9. A process for making a gas-filled article from polytetrafluoroethylene plastic which comprises charging said plastic in powder form into a cavity to form a first layer therein, placing on said layer a thermally stable solid capable of evolving gas by reaction with steam, said solid being placed only on the central portion of said layer in a manner such that a continuous peripheral portion of said plastic layer remains substantially free from said gas-evolving solid, covering said gas-evolving solid and said peripheral portion of said first layer of plastic with a second layer of said plastic, compacting said layers by applying pressure thereto, sintering the resulting compact by heating to a temperature above about 620 and below about 740° F., and exposing said sintered compact to steam until a gas filling is generated therein.

10. A process according to claim 9 wherein said thermally stable solid is barium peroxide.

11. A process according to claim 9 wherein the gas-filled compact is heated to a temperature between about 575 and 610° F. while maintaining it under an external pressure of about 150 to 1500 p.s.i.g., and cooling the gas-filled compact while maintaining an external pressure in excess of the pressure of the gas filling.

[12. A process for making closed cell plastic foam which comprises forming an intimate blend of one part by weight of plastic and about 0.005 to 0.1 part by weight of thermally stable gas-evolving powdered solid, molding said blend at elevated temperature to produce a body containing said solid dispersed in a continuous phase of said plastic, and exposing said body to a fluid capable of diffusing through the plastic itself and of undergoing reaction with said dispersed solid under exposure conditions adapted to cause generation of a gas in the said reaction, and generating a gas thereby.]

13. A process for making plastic foam which comprises uniformly blending about 0.005 to 0.1 part by weight of aluminum carbide powder with one part of granulated polytetrafluoroethylene, compressing the resulting blend, sintering it at a temperature above about 620° and below about 740° F., and exposing the sintered blend containing the dispersed carbide powder occluded therein to steam until a closed cell plastic foam is formed.

14. A process for making plastic articles containing at least one gas filled closed cell within a continuous plastic envelope which process comprises encapsulating a thermally stable solid generant within a body of polytetrafluoroethylene plastic, compacting and sintering said body, and exposing the resulting sintered body to steam, whereby said steam permeates through the plastic itself and causes a gas filled closed cell to be evolved therein, said generant being a material capable of reacting with steam with evolution of a gas to which polytetrafluoroethylene is relatively impermeable.

*15. A process for making gas-inflated plastic articles containing at least one gas-filled closed cell therein which process consists essentially in placing a thermally stable solid generant between two layers of a plastic, sealing said layers to form an envelope whereby the generant is encapsulated within a continuous phase of plastic, and exposing said generant-containing plastic envelope to a fluid which diffuses through said continuous phase of plastic and releases a gas within said plastic envelope by reaction with said encapsulated generant, thereby inflating said envelope.*

*16. A process for making articles of polytetrafluoroethylene containing at least one gas-filled closed cell therein which comprises encapsulating aluminum within a continuous phase of polytetrafluoroethylene and exposing said*

*polytetrafluoroethylene and the aluminum encapsulated therein to concentrated aqueous hydrochloric acid which diffuses through the polytetrafluoroethylene and reacts with the encapsulated aluminum to release hydrogen within the polytetrafluoroethylene, said exposure being effected under exposure conditions adapted to maintain said hydrogen releasing reaction.*

References Cited

The following references, cited by the Examiner, are of record in the patented file of this patent or the original patent.

UNITED STATES PATENTS

| | | | |
|---|---|---|---|
| 2,133,805 | 10/1938 | Brown | 161—158 |
| 2,274,231 | 2/1942 | Behrman | 161—168 |
| 2,332,671 | 10/1943 | Scherer | 264—4 |
| 2,395,293 | 2/1946 | Pfleumer | 264—28 |
| 2,504,208 | 4/1950 | Locket et al. | 106—171 |
| 2,525,965 | 10/1950 | Smith | 264—55 |
| 2,589,537 | 3/1952 | Carpentier | 264—55 |
| 2,698,968 | 1/1955 | Callahan et al. | 264—316 |
| 2,728,698 | 12/1955 | Rudner | 264—54 XR |
| 2,802,240 | 4/1957 | Thomas | 264—54 |
| 2,860,377 | 11/1958 | Bernhardt et al. | 264—50 |
| 2,905,648 | 9/1959 | Haas | 264—54 XR |
| 2,917,472 | 12/1959 | Smith | 264—47 XR |
| 2,961,712 | 11/1960 | Davis | 264—131 |
| 2,976,093 | 3/1961 | Reiling | 264—273 XR |
| 2,985,918 | 5/1961 | Moore | 264—53 |

FOREIGN PATENTS

| | | |
|---|---|---|
| 244,901 | 7/1947 | Switzerland. |

OTHER REFERENCES

Du Pont Bulletin "Teflon," No. X7c, July 1957, pages 1–11.

The Rubber and Plastics Age "Polytetrafluoroethylene," vol. 35, No. 6, June 1954, pages 278–9.

Chicago Gasket Co., "New Ways to Use, 'Korda Teflon' Products," Bulletin B–4A, June 10, 1952.

ALEXANDER H. BRODMERKEL, *Primary Examiner.*

P. E. ANDERSON, *Assistant Examiner.*